United States Patent
Fink et al.

(10) Patent No.: US 12,378,441 B2
(45) Date of Patent: Aug. 5, 2025

(54) FILM STACK, KIT COMPOSED OF FILM STACK AND ADHESIVE TAPE, AND A COVERING TAPE AND A METHOD FOR THE PRODUCTION THEREOF

(71) Applicant: TESA SE, Norderstedt (DE)

(72) Inventors: Mathias Fink, Hamburg (DE); Tim Simon, Norderstedt (DE); Jennifer Böhm, Hamburg (DE)

(73) Assignee: TESA SE, Norderstedt (DE)

( * ) Notice: Subject to any disclaimer, the term of this patent is extended or adjusted under 35 U.S.C. 154(b) by 309 days.

(21) Appl. No.: 17/908,174

(22) PCT Filed: Mar. 26, 2021

(86) PCT No.: PCT/EP2021/058032
§ 371 (c)(1),
(2) Date: Aug. 30, 2022

(87) PCT Pub. No.: WO2021/191452
PCT Pub. Date: Sep. 30, 2021

(65) Prior Publication Data
US 2023/0118674 A1    Apr. 20, 2023

(30) Foreign Application Priority Data
Mar. 27, 2020  (DE) ............... 10 2020 203 982.8

(51) Int. Cl.
*C09J 7/20*  (2018.01)
*C09J 7/21*  (2018.01)
(Continued)

(52) U.S. Cl.
CPC ............... *C09J 7/203* (2018.01); *C09J 7/21* (2018.01); *C09J 7/22* (2018.01); *C09J 7/28* (2018.01);
(Continued)

(58) Field of Classification Search
CPC ....... C09J 7/203; C09J 7/21; C09J 7/22; C09J 7/28; C09J 2203/37; C09J 2301/12;
(Continued)

(56) References Cited

U.S. PATENT DOCUMENTS 4,323,608 A * 4/1982 Denny ................. G09F 3/0289
40/310
5,935,669 A   8/1999 Leeuwenburgh
(Continued)

FOREIGN PATENT DOCUMENTS

EP    0548576 A1    6/1993
EP    0841384 A2    5/1998
(Continued)

OTHER PUBLICATIONS

International Search Report mailed May 14, 2021, in connection with PCT International Application No. PCT/EP2021/058032.
(Continued)

*Primary Examiner* — George R Koch
*Assistant Examiner* — Christopher C Caillouet
(74) *Attorney, Agent, or Firm* — Norris McLaughlin, PA

(57) ABSTRACT

Masking film stacks, kits composed of said film stacks, adhesive tapes, and covering tapes, and methods for producing said stacks and kits are provided. The masking film stacks comprise masking films having widths and lengths, wherein the masking films are foldable along folding lines, running along the lengths, to form double-ply-folded masking films such that two free longitudinal edges of the double-ply-folded masking films run adjacent to each another and the double-ply masking films are foldable to form stacks and the two longitudinal edges lie on the masking film stacks.

18 Claims, 1 Drawing Sheet

(51) Int. Cl.
*C09J 7/22* (2018.01)
*C09J 7/28* (2018.01)

(52) U.S. Cl.
CPC ........ *C09J 2203/37* (2020.08); *C09J 2301/12* (2020.08)

(58) Field of Classification Search
CPC .... C09J 2203/31; C09J 2203/354; C09J 7/38; C09J 7/245; B05B 12/24
See application file for complete search history.

(56) References Cited

U.S. PATENT DOCUMENTS

| | | |
|---|---|---|
| 6,723,406 B2 | 4/2004 | Nickel |
| 6,962,748 B2 | 11/2005 | Nickel |
| 2002/0114946 A1 | 8/2002 | Nickel |
| 2002/0122936 A1 | 9/2002 | Nickel |
| 2004/0011473 A1* | 1/2004 | Van Tyle ........... B65H 35/0033 242/588 |
| 2009/0324879 A1 | 12/2009 | Anderson et al. |

FOREIGN PATENT DOCUMENTS

| | | |
|---|---|---|
| EP | 1149634 B1 | 10/2003 |
| EP | 1149883 B1 | 7/2005 |
| JP | H2-160883 A | 6/1990 |
| JP | H7-31908 A | 2/1995 |
| JP | H8-108474 A | 4/1996 |

OTHER PUBLICATIONS

English Translation of International Search Report dated Mailed 14, 2021, in connection with PCT International Application No. PCT/EP2021/058032.

Written Opinion issued in connection with PCT International Application No. PCT/EP2021/058032, Mailed Oct. 6, 2022.

* cited by examiner

FILM STACK, KIT COMPOSED OF FILM STACK AND ADHESIVE TAPE, AND A COVERING TAPE AND A METHOD FOR THE PRODUCTION THEREOF

This application is a 371 of PCT/EP2021/058032, filed Mar. 26, 2021, which claims foreign priority benefit under 35 U.S.C. § 119 of the German Patent Application No. 10 2020 203 982.8, filed Mar. 27, 2020, the disclosures of which are incorporated herein by reference.

The invention relates to a masking film stack with a masking film, to a kit with a masking film stack and an adhesive tape, and to a masking tape with an adhesive tape with at least one adhesive side for adherence to a working face, and with an edge portion and, laminated on the edge portion, a masking film edge of a masking film which has a free manual engagement edge opposite the laminated-on masking film edge along a width of the masking film, and the masking film is folded toward the edge portion and forms a film stack.

The invention also relates to a method for producing a folded masking tape by laminating a masking film edge of a masking film onto an edge portion of an adhesive tape, folding the masking film toward the edge portion, and forming a film stack.

Masking tapes are of course well known in the prior art.

Known from EP 1 149 883 B1 is a masking tape with an adhesive tape having a paper carrier with a self-adhesive composition, where masking material with good paint adhesion is laminated on in the edge region of the self-adhesive composition and in the same edge region of the self-adhesive composition a masking film is laminated on, and the masking film completely covers the masking material, and the masking film lies behind the masking material.

The masking tape exhibits good adhesion for coating material, which therefore does not drop off even after oven drying. The masking tape is especially suitable for masking areas not to be coated in the context of automotive finishing.

EP 1 149 634 B1 discloses a masking tape composed of a temperature-stable adhesive tape having a flexible film carrier and a self-adhesive composition, there being a masking material laminated on in the edge region of the self-adhesive composition, this material exhibiting good paint adhesion and absorbency. A masking film laminated on in the same coating material edge region likewise lies behind the masking material in the adhered state. In contrast to the first-mentioned publication, there is general disclosure here of a masking material having good paint adhesion and absorbency. This masking tape as well is suitable for marking areas to be left out when finishing automobiles.

The masking film is typically very wide, and it is therefore folded and disposed in a film stack next to the adhesive tape. The masking tape is typically provided in the form of roll product. It has proven disadvantageous that the masking film is difficult to unfold, since a manual engagement edge in the film stack disappears and is concealed by the masking material. Moreover, automatic gripping devices are unable to take hold of such manual engagement edges, or only with great difficulty, and reliable automatic unfolding of the foil is therefore not possible.

In a first aspect, therefore, an object of the present invention is to provide a masking film stack with which the disadvantages stated above can be diminished.

In a second aspect it is an object of the invention to provide a kit which can be used to produce a masking tape that diminishes the disadvantages stated above.

In a third aspect, therefore, it is an object of the present invention to provide a masking tape which is easier to unfold.

In a fourth aspect it is an object of the invention to provide a method for producing a more easily unfoldable masking tape.

The object is achieved in its first aspect by a masking film stack having the features of claim 1.

The masking film stack of the invention comprises or more particularly consists of a masking film which has a width and a length, and the masking film is folded along a folding line, running along the length, to form a double ply, where two free longitudinal edges of the double-ply-folded masking film run adjacent to one another and the double-ply masking film is folded to form a stack. In this arrangement, one of the free longitudinal edges lies freely accessible on the masking film stack.

The masking film typically has a rectangular outer periphery, with the length, which is greater by a multiple than the width, and with the width, which is greater by a multiple than a thickness of the masking film. The length of the masking film may be in principle infinite, at least several meters; the width of a masking film, however, may also be between a number of centimeters, decimeters through to a number of meters. In order to make such masking films manageable, the masking films are folded to form a stack. The masking film stack of the invention employs the concept of initially folding the masking film into a double ply and then folding it such that the two longitudinal edges, which run in longitudinal direction, run adjacent to one another. They may run exactly over one another or else may run offset from one another; preferably they lie on the masking film stack. An outer and an inner longitudinal edge are formed. The outer longitudinal edge in this case is freely accessible and can be grasped with the fingers.

The inner longitudinal edge, lying between the masking film stack and the outer longitudinal edge, either is covered by the outer longitudinal edge or protrudes by some way under the outer longitudinal edge, so that it too is freely accessible, being able to be grasped with the fingers or else being grippable with a machine and able to be passed on for further use. More particularly the lower free longitudinal edge may be machine-grippable and joined to an adhesive tape which is supplied manually or else by machine to the masking film stack.

Preferably the masking film is folded in a concertina fold and an outer double ply is placed at least in U-shape around the concertina stack. As a result of the U-shaped encompassing of the concertina stack by the outer double ply, the masking film stack remains coherent and can be utilized more easily.

In another embodiment of the invention, the double ply is folded in a helical fold. Here as well, an outer masking ply preferably encompasses the masking film stack, preferably in U-shape. Mixtures of the concertina folding and the helical folding are also conceivable.

Conveniently the outer longitudinal edge lies externally on the masking film stack and is freely graspable. It preferably forms a manual engagement edge. The outer longitudinal edge can be easily grasped by the fingers of a user and in this way the masking film can be pulled apart along the width. Conveniently the manual engagement edge and also, in principle, the longitudinal edges extend over the entire longitudinal extent of the masking films and of the masking film stack. The masking film stack has a length which corresponds to the length of the masking film; a width of the masking film stack is smaller by a multiple than the width of the masking film itself. Conveniently in this way the masking film stack can be rolled into a roll and stored.

In one development of the invention the outer longitudinal edge of the outer masking film ply is turned over backward. The outer longitudinal edge is therefore particularly readily accessible and graspable with the fingers.

The manual engagement edge may also have colored or haptic marking, so that it is easily recognizable and can also be grasped with the fingers.

The masking film is conveniently in the form of PE, PP, PA, PBT or PET film, but may also be paper or a metal foil (for example, aluminum foil). Composite films of film materials above are especially advantageous, furthermore. Other materials are also conceivable, however.

In the second aspect the object is achieved by a kit having the features of claim 8.

The kit comprises a masking film stack and an adhesive tape. The masking film stack here is preferably one of the abovementioned masking film stacks, and the kit may consist of one of the abovementioned masking film stacks and an adhesive tape. The adhesive tape has an adhesive side for adherence to a working face, and a carrier layer. The carrier layer is conveniently a crepe adhesive tape or a PVC-containing adhesive tape.

The masking film stack and the adhesive tape are harmonized with one another such that one of the free longitudinal edges, preferably the inner longitudinal edge, of the masking film of the masking film stack can be connected to the adhesive tape.

The adhesive tape and the masking film stack, rolled up as a roll product, may for example be fitted rotatably onto pegs in an applicator, and, during a removal operation, the lower free longitudinal edge of the folded masking film is connected securely to an edge portion of the adhesive tape and is then adhered to a working surface. It is also conceivable for the inner free longitudinal edge of the masking film to have an adhesive strip with which the adhesive film stack can be applied, more particularly adhered or laminated, to the adhesive tape on an adhesive tape area facing away from the adhesive side. In that case the adhesive tape preferably comprises the carrier layer and the adhesive layer, and the adhesive strip of the masking film edge is adhered at the top to the carrier layer. Other forms of connection, by lamination or the like, are of course also conceivable.

The object is achieved in its third aspect by an aforementioned masking tape having the characterizing features of claim 11.

In the invention the masking film has a manual engagement edge which is disposed lying freely on the film stack.

A tape here refers in principle to an entity having a length, a width, and a thickness, with the length being the multiple of the width and the width being a multiple of the thickness. The masking tape may have a consistent width over its entire longitudinal extent, and a different thickness along the extent of the width. The thickness, however, may also be constant along the width.

The masking tape of the invention comprises an adhesive tape and a masking film. The adhesive tape conveniently comprises a carrier layer and a layer of adhesive. The carrier layer may consist of common plastics, such as polyethylene, polypropylene or further plastics described below. The carrier layer may also consist of paper or of metal foils (for example, aluminum foil). The layer of adhesive may be a pressure-sensitive adhesive, consisting of various materials, such as nonpolar elastomers, for example. It may alternatively consist of acrylates, for example. These as well are set out later on below.

The adhesive tape of the masking tape preferably has a thickness and width which are consistent over its entire length. The masking film likewise preferably has a thickness which is consistent over its length and width.

The masking film comprises a masking film edge which is laminated on one edge portion of the adhesive tape. The masking film may be secured on the side of the adhesive tape facing away from the adhesive side; it may also be laminated on the adhesive side. By securing is meant, preferably, laminating; alternatively, the masking film may be welded on, secured via a heat-sealing layer, bonded adhesively, or otherwise secured. The masking tape may also be generated locally through the use of a tool, with the tool referred to locally securing a separate adhesive tape on the folded masking film.

The masking film is preferably likewise tapelike in configuration. It has a free manual engagement edge opposite the laminated-on masking film edge along the length of the masking film. The manual engagement edge is a masking film edge which is opposite the secured masking film edge and whose outermost end forms the manual engagement edge.

For sale and for storage, the masking tape is typically provided with a folded-together masking film. In this case the masking film is folded toward the edge portion and forms a film stack. The folded-together masking film is wound to form a reel.

In the folded-together state of the masking film, the masking tape can be easily rolled up. The film stack in this case has a width which is much lower than the width of the masking film. The film stack may be formed by 3, 5, 7, 9, 12 or even more folds of the masking film.

A feature of the film stack of the masking film according to the invention is that the manual engagement edge lies on a side of the film stack opposite the adhesive side of the adhesive tape. After the unwinding of the masking tape from the reel, the manual engagement edge can be simply engaged with the fingers, and the masking film can then be spread out readily. It is no longer necessary, as in the prior art, for the manual engagement edge to be "fished out" between film stack and a masking material or to be groped for laboriously in a film stack and extracted. Additionally it is possible for the manual engagement edge to be taken hold of automatically and gripped.

Conveniently the manual engagement edge lies freely on a side of the film stack opposite the adhesive side of the adhesive tape. Hence it is possible for the masking tape first to be unrolled, then the adhesive tape adhered with its adhesive side onto the working face, after which the masking film can easily be grasped at the manual engagement edge, lying at the top on the film stack of the adhered masking tape, and pulled apart.

In one preferred embodiment the manual engagement edge—with manual engagement edge referring not to a logical line but instead to a very narrow strip along the outer free edge of the masking film—has an inner side which is arranged under contact on the film stack, and an outer side which has no contact, meaning that the outer side neither has contact with the film stack nor has any contact with the adhesive tape. It is also possible, however, for the manual engagement edge to be crimped or folded. Furthermore, the manual engagement edge may be specially emphasized visually and/or haptically by colored marking or attachment of contrast-generating strips.

The manual engagement edge arranged in this way lies freely accessible for the user at the top on the film stack, opposite the working face of the adhered masking tape on the film stack, so that the manual engagement edge can be grasped by the user with the fingers and can be peeled off from the film stack, thereby fully unfolding the masking film. In the fully unfolded state, the masking film is in the form of a flat single ply.

With particular preference the film stack has a double-ply concertina folding—in other words, first the masking film is folded over once along the width completely or with a slight offset, so that the masking film takes the form of a double ply (in the case of offset, with a short and longer section of the film), and the resultant double ply is then folded concertinawise. In this case the concertina folding is folded preferably below, in other words opposite the manual engagement edge, on the adhesive side of the masking tape, so that the manual engagement edge continues to lie freely accessible at the top, facing away from the adhesive side of the masking tape, on the film stack. Alternatively the double ply may be present with only one fold.

Conveniently the film stack here has an outer folded ply of the masking film, which in a U-shape encompasses all of the other folded plies of the film stack on a side of the film stack facing away from the adhesive side of the adhesive tape. The outermost folded ply encompasses the entire film stack in a U-shape and so holds the film stack together, when the masking tape is unrolled and the adhesive side of the adhesive tape is already adhered on the working face. Accordingly there is no automatic unfolding of the film stack.

The masking film is conveniently in the form of a PE, PP, PA, PBT or PET film, but may also be paper or a metal foil (for example, aluminum foil). Furthermore, in particular, composite films of above films/film materials are advantageous. Further plastics are set out in the specific embodiment of the invention, but may be used for all embodiments of the masking tape.

The adhesive tape may conveniently be designed as a masking adhesive tape. PVC-based adhesive tapes are advantageous in this case. The adhesive tape may additionally be designed as a crepe tape. This is a particularly cost-effective form of the adhesive tape. In principle, however, all adhesive tapes are conceivable, including those without carrier material.

In terms of the method, the object is achieved by an aforementioned method having the features of claim 15.

The production method is especially suitable for producing one of the abovementioned masking tapes. Conversely, the abovementioned masking tapes can be conveniently produced by one of the methods stated below.

The method concerns the production of a folded masking tape, by securing an edge portion of a masking film on an edge portion of an adhesive tape, folding the masking film toward the edge portion, and forming a film stack. With regard to the interpretation of the concepts of the edge and of the arrangement, reference is made to the statements above.

In the method, in the invention, a free manual engagement edge opposite the laminated-on masking film edge along a length of the masking film is disposed lying freely on the film stack. By folding of the masking film, which may well amount to a width of 50 cm, 1 m, 1.5 m, 2 m, 2.5 m or more and is consequently not very manageable, the masking tape may be folded to a much lower width. The width of the folded masking tape is only 20 cm, 40 cm or 60 cm, with all dimensions in between also being disclosed. Other widths of the folded-together masking tape are also conceivable.

The folding of the invention is designed such that the edge of the masking film which is free and which lies opposite the adhesive tape also lies at the top on the film stack after folding, easily accessible for the user. In this case the manual engagement edge lies preferably on the side of the film stack, preferably along the entire longitudinal extent, that is arranged on the masking tape opposite an adhesive side of the adhesive tape. As a result it is possible for the manual engagement edge to be grasped by the user easily along the entire longitudinal extent, even after the masking tape has already been adhered with the adhesive tape to a working face.

Conveniently the masking film is made into a double ply and folded concertinawise. As a result of the concertinawise folding, the film stack is formed. This stack is conveniently disposed on the adhesive side of the adhesive tape, and so the manual engagement edge continues to remain disposed freely accessible at the top on the film stack, opposite the adhesive side.

Conveniently the manual engagement edge is arranged, along preferably the entire longitudinal extent of the adhesive tape, at around 0 cm-10 cm next to the adhesive tape edge, but may also be arranged further from the adhesive tape. With particular preference the manual engagement edge bears directly against the adhesive tape.

The invention is described with reference to an exemplary embodiment in three figures, in which.

Figure 1:
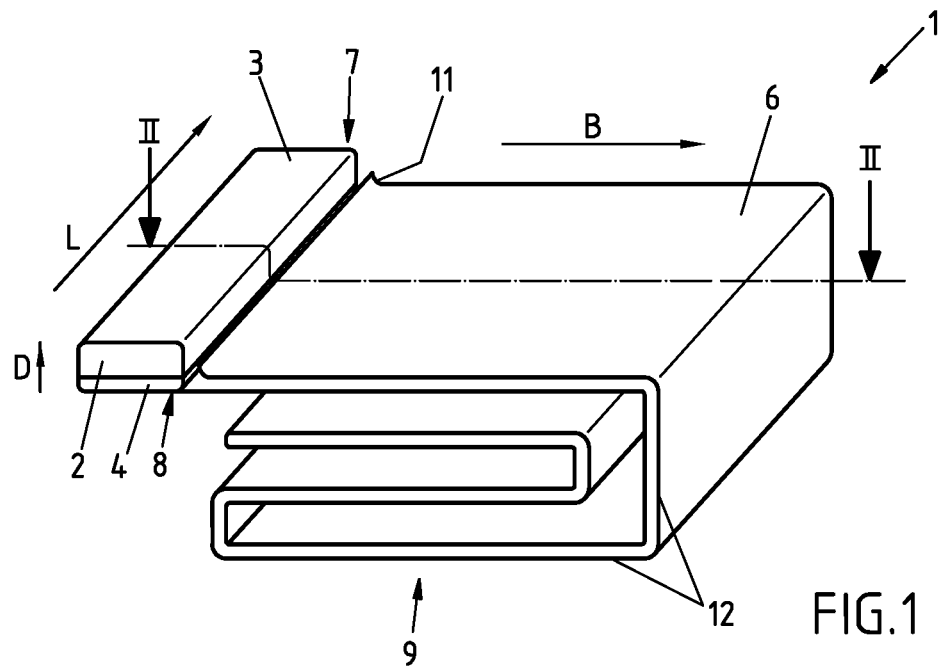
FIG. 1 shows a perspective view of a masking tape of the invention in the folded and unwound state.
Figure 2:
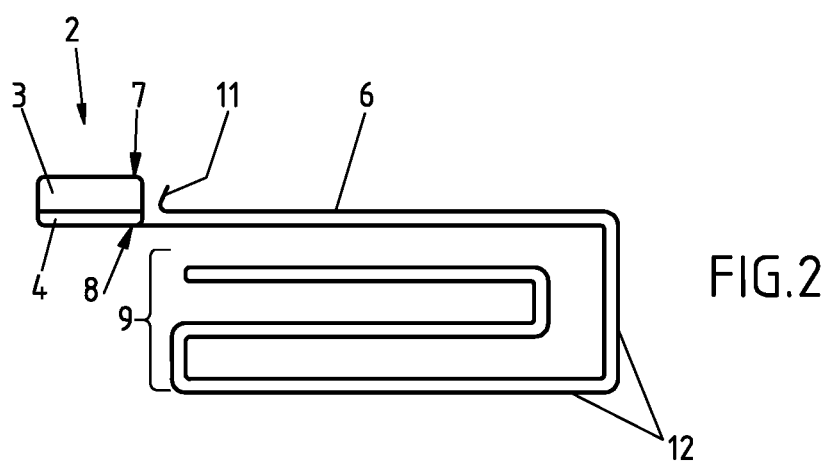
FIG. 2 shows a sectional view along the line II in FIG. 1.

FIG. 1 shows a masking tape 1 with an adhesive tape 2 which extends in a longitudinal direction L. A tape, i.e., masking tape 1 or adhesive tape 2, is understood to be a tape which is essentially very long, in principle infinite, in its extent in the longitudinal direction L, having a length L which is greater by a multiple than an extent along a width B. The tape 1, 2 also has an extent along a thickness D. The thickness of the masking tape 1 is different along the width B. Typical dimensions are indicated below. The adhesive tape 2 in this example typically has a width B of 15 mm to 30 mm, and in the portion of the adhesive tape 2 the masking tape has a thickness of 100 μm to 250 μm. The masking film 6 goes off from the longitudinal side of the adhesive tape 2. The width B of the masking tape 1 in the portion of the masking film 6 here is typically 500 mm to 2500 mm; in the portion of the masking film 6, the masking tape 1 typically has a thickness of 10 μm to 50 μm, where the thickness relates to an individual ply of the masking film and not to the entire masking stack.

The extent along the width B is greater by a multiple than the extent along the thickness D. "Multiple" here refers to 100 times to more than 10 000 times.

The adhesive tape 2 usually comprises a carrier layer 3 and a layer 4 of adhesive. The carrier layer 3 consists of a common plastic, paper and/or metal (for example, aluminum). Nonlimiting examples of plastics may include the following:

polyethylene (PE), polypropylene (PP)—especially the oriented polypropylene (OPP), produced by monoaxial or biaxial drawing, cyclic olefin copolymers (COC), polyvinyl chloride (PVC), polyesters—especially polyethylene terephthalate (PET), polyethylene naphthalate (PEN) and polybutylene terephthalate (PBT), ethylene-vinyl alcohol (EVOH), polyvinylidene chloride (PVDC), polyvinylidene fluoride (PVDF), polyacrylonitrile (PAN), polycarbonate (PC), polyamide (PA), polyethersulfone (PES), polyimide (PI), ethylene-vinyl acetate (EVA), and also copolymers, blends, multi-ply films or composite films of abovementioned polymers, which for example are bonded, welded or coextruded. The carriers may additionally be present in treated form, treated by coating with a primer or varnish, pretreated by corona and/or etching, printed or otherwise modified, for example. Paper may likewise be in coated, creped, printed or otherwise pretreated and/or modified form. The same applies to metal-based carriers.

The layer 4 of adhesive consists of a customary pressure sensitive adhesive, examples being acrylates, natural and synthetic rubber compositions, silicones, etc.

The adhesive layer 4 is preferably applied over the full area of one side of the carrier layer 3. It may alternatively be arranged along a stripe on the carrier layer next to the masking film.

On the masking film side, the adhesive tape 2 has an edge portion 7 which may also be part of the adhesive layer 4. On the edge portion 7 there is a masking film edge 8 of the masking film 6 secured.

The masking film 6 preferably likewise comprises—by way of example but without limitation—the following material:

paper, metal (for example, aluminum), polyethylene (PE), polypropylene (PP)—especially the oriented polypropylene (OPP), produced by monoaxial or biaxial drawing, cyclic olefin copolymers (COC), polyvinyl chloride (PVC), polyesters—especially polyethylene terephthalate (PET), polyethylene naphthalate (PEN) and polybutylene terephthalate (PBT), ethylene-vinyl alcohol (EVOH), polyvinylidene chloride (PVDC), polyvinylidene fluoride (PVDF), polyacrylonitrile (PAN), polycarbonate (PC), polyamide (PA), polyethersulfone (PES), polyimide (PI), ethylene-vinyl acetate (EVA), and also copolymers, blends, multi-ply films or composite films of abovementioned polymers, which for example are bonded, welded or coextruded. The carriers may additionally be present in treated form, treated by coating with a primer or varnish, pretreated by corona and/or etching, printed or otherwise modified, for example. Paper may likewise be in coated, creped, printed or otherwise pretreated and/or modified form. The same applies to metal-based carriers.

The masking tape 1 in FIG. 1 is very long, with only a portion of the masking tape 1 that is short in longitudinal direction L being shown here. The masking tape 1 may be conveniently wound to form a reel. The wound state is the state in which the masking tape is preferably transported and stored prior to use. In this state, the adhesive layer 4 of the adhesive tape 2 is on the inside of the reel and the carrier layer 3 of the adhesive tape 2 on the outside of the reel. The masking tape 1 may be wound around a core through which one end of a bracket is placed for the application of the masking tape 1, allowing continuous unwinding of the masking tape 1 from the reel. The core may be made for example of cardboard—including siliconized cardboard—or of a plastic such as polyethylene (PE), for example.

The masking film 1 is folded to form a film stack 9. The folding lines all run parallel to the longitudinal direction L.

A feature of the folded masking tape 1 of the invention shown in FIG. 1 is a manual engagement edge 11, which is exposed and therefore readily engageable, which is arranged opposite to the masking film edge 8, which is laminated onto the edge portion 7 of the adhesive tape 2, on the folded masking film 6. Freely engageable here means that the manual engagement edge 11 extends freely engageably over the entire longitudinal extent of the masking tape 1 and is arranged about 0 to 10 cm next to and parallel to the adhesive tape 2, in precise terms next to the carrier layer 3 of the adhesive tape 2. After the masking tape 1 has been unwound, according to FIG. 1, the manual engagement edge 11 lies free. It is not covered by a covering material or the like, but is instead visible along its entire longitudinal extent and is directly touchable and engageable for the user, and can be determined by semimechanical or all-mechanical optical systems and gripped by semimechanical or all-mechanical mechanisms when the masking tape 1 is unwound from the reel.

For particularly simple recognition, the manual engagement feature may be emphasized, for example, in colored form, by additional folding, bonding and/or by crimping, to give it particular optical and/or tactile emphasis.

Figure 3:
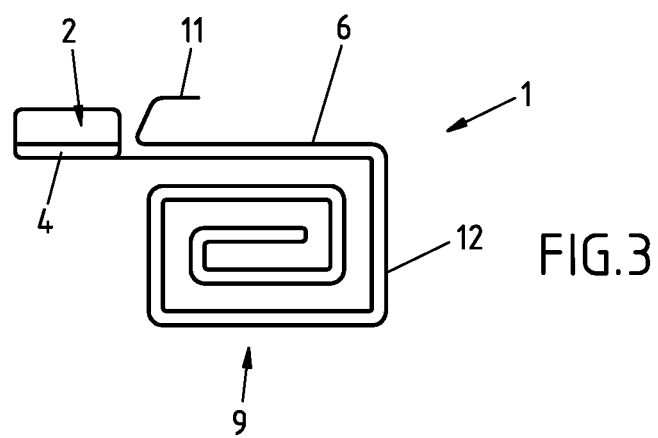
FIG. 3 shows a sectional view of a further embodiment of the masking tape of the invention.

FIG. 3 shows the sectional view of a further embodiment of the masking tape 1 of the invention. The further embodiment of the masking tape 1 again has a masking tape 2 to which a masking film stack 9 is adhered along its entire longitudinal extent. In the further embodiment according to FIG. 3, an internal longitudinal edge of the masking film 6 is adhered to an adhesive layer 4 of the adhesive tape. Other modes of fastening are of course also conceivable.

The masking film stack 9 of FIG. 3 comprises the spirally or helically stacked two-ply masking film 6. Here as well an outer masking film ply 12 is guided in an approximate U-shape around the masking film stack 9. The manual engagement edge 11 of the masking film 6 is turned back backward. Backward here means turned away from the adhesive tape 2. As a result, the manual engagement edge 11 has a particularly easily graspable configuration. In particular it may easily be engaged using the user's fingers.

A width B of the masking film 6 folded out may be between 50 cm and 2.50 m, preferably between 1.4 m and 1.9 m. However, all other dimensions in between are conceivable and also disclosed. The unfolded masking film may also have larger or smaller widths B.

For producing the masking tape 1 of the invention, the masking film 6 is first fastened with the masking film edge 8 along the entire longitudinal extent on the edge portion 7 of the adhesive tape 2 and then initially folded to a double ply. In this case the masking film is folded over with a slight offset along a fold line which runs in longitudinal direction L, and the manual engagement edge 11 is folded toward the adhesive tape 2, so that the manual engagement edge 11 is disposed on the side of the masking film 6 that is opposite the adhesive layer 4.

The masking film 6 is then folded to a double ply over substantially its entire extent. It is subsequently folded to a double ply concertinawise on the side opposite the manual engagement edge 11, to form the film stack 9. The concertina folding here is folded from outside to inside, i.e., toward the manual engagement edge 11. As a result, an outer folded ply 12 of the masking film 6 is formed, which encompasses the other folded plies, on a side of the film stack 9 that faces away from the adhesive tape 2, in a U-shape, preferably encompassing them completely on three sides.

Another method for producing the masking tape begins first with the folding of the film to form a double ply. It has proven particularly advantageous to use a film with asymmetric single folding which is already present in wound form on a core. This film is obtained, for example, in blown film extrusion, where with dual-benefit manufacture the film bubble formed is slit asymmetrically and then collapsed and wound up.

Another possibility is based on a symmetrical slitting, to produce a bubble slit at the edge. This bubble is then laid exactly over on itself, and asymmetric film sections are produced with subsequent edge trimming. The asymmetrically folded film is subsequently folded in accordance with the method described above, to produce the completed film stack. An adhesive tape is then fastened on the film stack. In principle the adhesive tape may be fastened on the masking film edge at any point in the manufacture.

The film stack may also be already completely folded and wound up on a core. In that case, the adhesive tape is fastened locally on the masking film edge using a tool which is able to hold and guide both an adhesive tape and the wound film stack, and the masking tape accordingly can be produced with the tool.

FIG. 1 does not show that the masking tape 1 is wound. Customarily the masking tape 1 is wound about a winding axis which in FIG. 1 is disposed beneath the masking tape 1, so that the adhesive layer 4 is on the inside of the reel and the carrier layer 3 of the adhesive tape 1 is on the outside of the reel.

An advantage of the concertina folding according to FIG. 1 of the masking film 6 is that the masking film 6 of the masking tape 1 adhered to the working face (not shown) can be fully unfolded by gripping the manual engagement edge 11 and performing a pulling movement. Another advantage is that the adhered and as yet not unfolded masking film 6 remains in its position, since the outer folded ply 12 completely encompasses the masking film stack 9. Automatic unfolding is therefore not possible. Moreover, the folds of the film stack need not be located at the same height, but may instead have an offset from one another.

LIST OF REFERENCE SYMBOLS

1 masking tape
2 adhesive tape
3 carrier layer
4 adhesive layer
6 masking film
7 edge portion on masking film side
8 masking film edge
9 film stack
11 manual engagement edge
12 outer folded ply
B width
D thickness
L longitudinal direction

The invention claimed is:

1. A masking film stack comprising:
a masking film having a masking film edge, a manual engagement edge located opposite with respect to the masking film edge, a width, and a length, wherein the masking film is folded along at least one folding line, running along the length, to form a double-ply-folded masking film such that two free longitudinal edges of the double-ply-folded masking film run adjacent to each another and the double-ply masking film is folded to form the masking film stack and the two longitudinal edges lie on the masking film stack, wherein an angle or a curve is disposed between the masking film stack and the manual engagement edge such that the manual engagement edge extends outwardly from the masking film stack, lies externally with respect to the masking film stack, and is freely graspable.

2. The masking film stack according to claim 1,
wherein the double-ply-folded masking film is folded in a concertina fold and an outer double ply is placed at least in U-shape around a concertina stack.

3. The masking film stack according to claim 2,
wherein the manual engagement edge is turned over backward.

4. The masking film stack according to 1,
wherein the double-ply-folded masking film is folded in a helical fold.

5. The masking film stack according to claim 1,
wherein the manual engagement edge has colored or tactile marking.

6. The masking film stack according to claim 1,
wherein the masking film is a PE, PP, PA, PET or PBT film or is a composite film of PA and PE or PP and PE or is made of paper or is an aluminum foil.

7. The masking film stack according to claim 1,
wherein the masking film stack is wound on a cardboard or plastic core.

8. A kit comprising:
an adhesive tape having a carrier and a layer of adhesive for adherence to a working face; and
a masking film having an inner longitudinal edge, an outer longitudinal edge, a width, and a length,
wherein
the masking film is folded along a folding line, running along the length, to form a double-ply-folded masking film such that two free longitudinal edges of the double-ply-folded masking film run adjacent to each another and the double-ply masking film is folded to form the masking film stack and the two longitudinal edges lie on the masking film stack,
the masking film stack and the adhesive tape are configured such that the inner longitudinal edge of the masking film of the masking film stack is connected to the adhesive tape, and
the outer longitudinal edge of the masking film lies externally on the masking film stack on a side of the masking film stack that is adjacent to the carrier of the adhesive tape, is freely graspable, and forms a manual engagement edge.

9. The kit according to claim 8,
wherein the adhesive tape has a carrier layer which is a crepe layer or a PVC-containing carrier layer.

10. A masking tape with
an adhesive tape having a carrier, at least one adhesive side for adherence to a working face, and an edge portion; and
a masking film edge of a masking film disposed on the edge portion of the adhesive tape, wherein the masking film has a width and a free manual engagement edge opposite the masking film edge along the width of the masking film, where the masking film is folded toward the edge portion and forms the masking film stack according to claim 1,
wherein the free manual engagement edge is disposed lying freely on a side of the masking film stack that is adjacent to the carrier of the adhesive tape.

11. The masking tape according to claim 10,
wherein the manual engagement edge lies on a side of the film stack opposite the adhesive side of the adhesive tape.

12. The masking tape according to claim 10,
wherein the manual engagement edge has an inner side which is disposed under contact on the film stack and has an outer side which has no contact.

13. The masking tape according to claim 10,
wherein the manual engagement edge is turned over in the adhesive tape-remote direction.

14. The masking tape according to claim 10,
wherein the adhesive tape takes the form of a crepe adhesive tape or PVC-containing adhesive tape.

15. A method for producing a folded masking tape, by
disposing a masking film edge of a masking film on an edge portion of an adhesive tape,
folding the masking film toward the edge portion and forming a masking film stack,
wherein
a free manual engagement edge opposite the masking film edge along a width of the masking film is disposed lying freely on the masking film stack, and
an angle or a curve disposed between the free manual engagement edge and the masking film stack such that the free manual engagement edge extends outwardly from the masking film stack.

16. The method according to claim 15,
wherein the masking film is made into a double ply and folded concertinawise.

17. The method according to claim 15,
wherein the masking film is made into a double ply and folded spiralwise.

18. The method according to claim 15,
wherein the free manual engagement edge is disposed adjacent to the adhesive tape.

\* \* \* \* \*